United States Patent
Schocke et al.

(10) Patent No.: US 10,384,499 B2
(45) Date of Patent: Aug. 20, 2019

(54) ADJUSTABLE HITCH MOUNTED DOOR CARRYING ASSEMBLY

(71) Applicant: MODIT, LLC, Azle, TX (US)

(72) Inventors: Robert Schocke, Azle, TX (US); Dwayne Gates, Azle, TX (US); Ron Segelquist, Azle, TX (US); Corbett Jennings, Azle, TX (US)

(73) Assignee: MODIT, LLC, Fort Worth, TX (US)

( * ) Notice: Subject to any disclaimer, the term of this patent is extended or adjusted under 35 U.S.C. 154(b) by 0 days.

(21) Appl. No.: 15/786,332

(22) Filed: Oct. 17, 2017

(65) Prior Publication Data

US 2018/0037074 A1 Feb. 8, 2018

(51) Int. Cl.
| | |
|---|---|
| *B60R 9/06* | (2006.01) |
| *B60D 1/06* | (2006.01) |
| *B60D 1/28* | (2006.01) |
| *B60D 1/54* | (2006.01) |
| *B60R 11/00* | (2006.01) |

(52) U.S. Cl.
CPC .............. *B60D 1/065* (2013.01); *B60D 1/28* (2013.01); *B60D 1/54* (2013.01); *B60R 9/06* (2013.01); *B60D 2001/544* (2013.01); *B60R 2011/0059* (2013.01)

(58) Field of Classification Search
CPC .. B60R 9/06; B60D 1/065; B60D 1/28; B60D 1/54; B60D 2001/544
USPC .......................................................... 224/521
See application file for complete search history.

(56) References Cited

U.S. PATENT DOCUMENTS

| | | | | |
|---|---|---|---|---|
| 5,377,886 A | * | 1/1995 | Sickler ...................... | B60R 9/10 224/521 |
| 6,039,227 A | * | 3/2000 | Stark ........................ | B60R 9/06 206/315.3 |
| 6,929,163 B1 | * | 8/2005 | Pedrini ..................... | B60R 9/06 224/506 |
| 7,275,670 B1 | * | 10/2007 | Shumack .................. | B60R 9/06 224/518 |
| 2012/0187658 A1 | * | 7/2012 | Wheeler ................... | B60D 1/01 280/415.1 |

* cited by examiner

*Primary Examiner* — Adam J Waggenspack
(74) *Attorney, Agent, or Firm* — Law Office of Jeff Williams, PLLC

(57) ABSTRACT

A hitch mounted carrying assembly for transporting a door of a vehicle is presented. The assembly includes an adjustable mount configured to releasably communicate with a hitch of the vehicle. The mount is adjustable between an extended position and a retracted position. The assembly includes a modular frame assembly configured to translate along the adjustable mount and to selectively couple to a first location along the mount. The frame is configured to hold a door of the vehicle on a set of hinges and secured about a latch bar. The distance between the frame assembly and the vehicle is configured to change when the mount is adjusted between the extended position and the retracted position.

17 Claims, 8 Drawing Sheets

ADJUSTABLE HITCH MOUNTED DOOR CARRYING ASSEMBLY

BACKGROUND

1. Field of the Invention

The present application relates to a modular carrying device, and more particularly to a modular hitch mounted door carrying assembly for carrying detachable doors from a vehicle on a telescoping mount.

2. Description of Related Art

Vehicles are a large part of society stemming from their usefulness in transportation, commuting, and entertainment. Over time, vehicles have become more than tools for a purpose and the public have developed loyalty, respect, and love for selected vehicles. An example is the Jeep ® brand of vehicles. This brand has a large following among the public. Part of the love of the brand is the ability to remove parts of the exterior body to expose the interior occupants to the outside environment. The ceiling panels may be removed along with doors to name a few.

An issue that commonly arises with the removable doors is how to store them when not attached to the vehicle. In order avoid leaning them against a wall or lying them on the ground where they could become damaged and dirty, some fans have developed a number of devices to hold the doors. One such example is a stand that is located on the ground and configured to hold the doors vertically. The doors are resting on the stand along the bottom edge of the door. Some stands have wheels to allow the stand to roll on the ground. In application, often the stand is located in the garage. Another device is a hanger coupled to a wall where supports are passed through the window frame of the door to hold it. With both of these devices, the doors are stored at the home/garage (or single location). The stand is not easily portable. Therefore the solution works only when the decision to remove and store the doors are made prior to traveling.

In an effort to make the stands more portable, steps have been taken to attach them to the vehicle to allow a user to carry the doors with the vehicle. Some devices are designed to attach to the back of the vehicle around the spare tire. Others are attached to the hitch of the vehicle. In both of these designs, use of these carrying devices prevents access to the rear of the vehicle. The rear doors of the vehicle are restricted from fully opening or permitting access of the driver or occupant to the rear storage area.

A further disadvantage that has arisen is how to handle the doors when the decision to remove and store them occurs while not at home and when the doors can't be attached to the vehicle. For example, the vehicle and driver could be out doing an excursion through the desert and decides to leave the doors off but can't safely take them while romping through the desert. In this scenario, the driver is left without any other option besides to leave the doors on the ground in some manner. In this position the doors are precariously exposed to scratches and further damage.

Although strides have been made to create a safe and secure method of storing doors from a vehicle when removed, shortcomings remain. A new device is needed to allow both portability of the doors and a safe method of storage at a remote location. Additionally, the new device should also permit full access to the rear storage area of the vehicle without the need to remove the doors from the carrying device.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
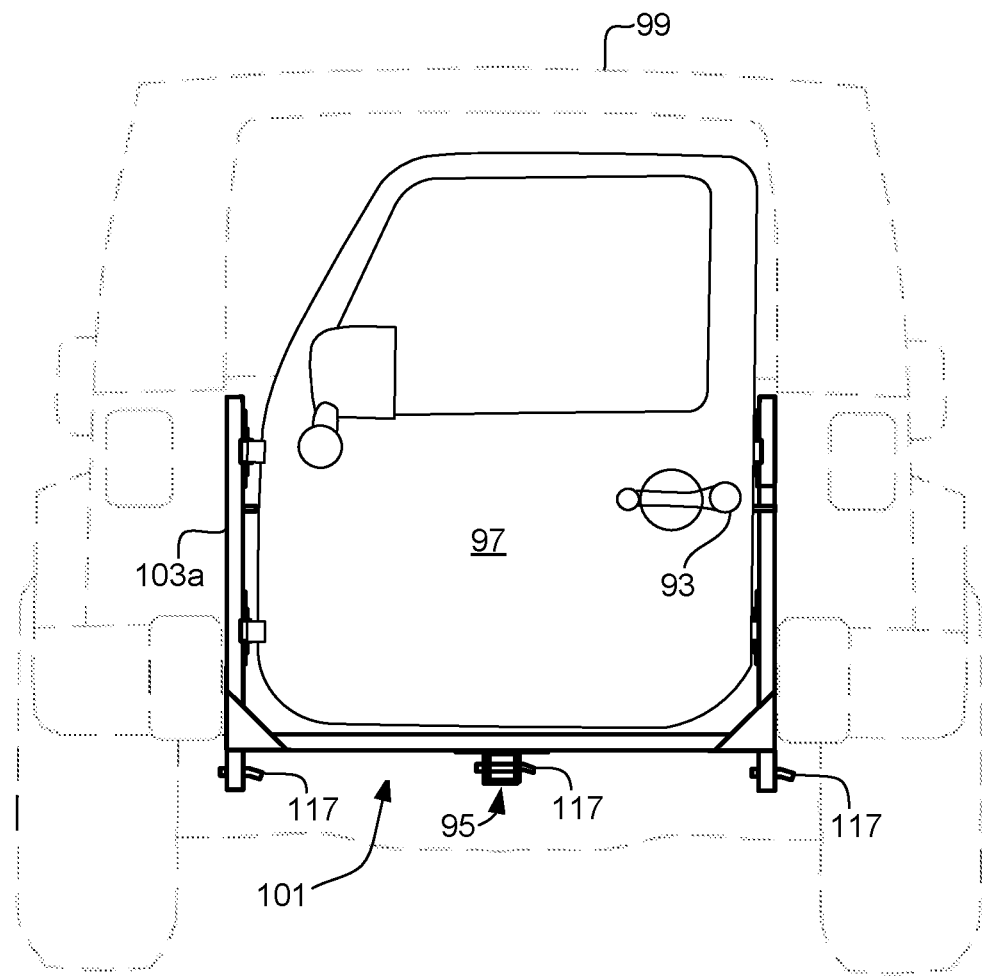
FIG. 1 is a rear view of an adjustable hitch mounted door carrying assembly according to an embodiment of the present application.
Figure 2:
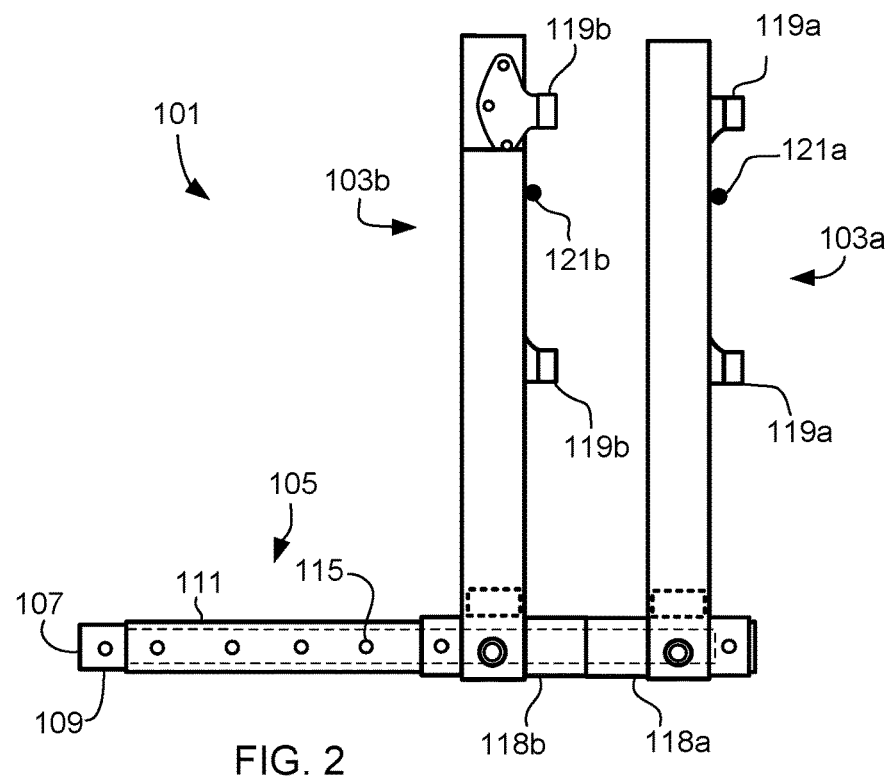
FIG. 2 is a side view of the adjustable hitch mounted door carrying assembly of FIG. 1.
Figure 3:
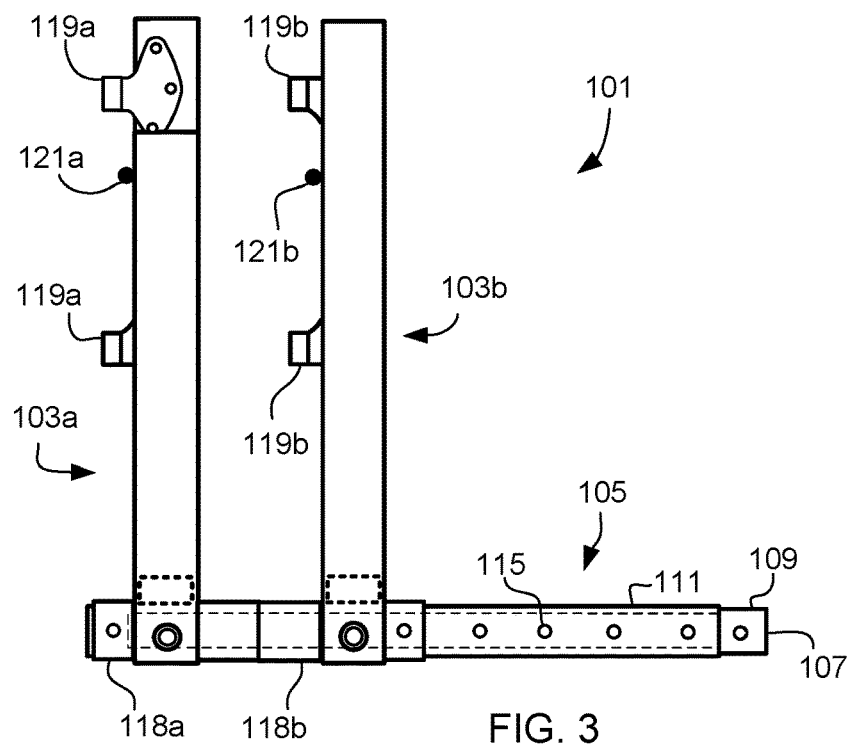
FIG. 3 is an alternate side view of the adjustable hitch mounted door carrying assembly of FIG. 1.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with traditional devices of securing vehicle doors when not installed on the vehicle. In particular, the assembly is configured as a modular system that attaches to the hitch mount of a vehicle. The assembly is configured to carry one or more doors of the vehicle within one or more frames. The doors are hung from the frames at the hinges and secured to the frames via the conventional door locking mechanism to prevent theft and inadvertent dislodgement. The assembly is further configured to telescope into and way from the vehicle to permit sufficient space to allow access to the rear storage area of the vehicle without having to remove the doors from the hitch mount or one or more frames. The assembly is also configured to provide extending leg stands within the frames to provide an elevated resting position for the doors relative to the ground when decoupled from the hitch mount. The frames are removable from the mount assembly to permit interchangeability and compact storage within the vehicle. The frames are also configured to translate along the mount assembly and releasably secure to one or more locations. These and other unique features of the assembly are discussed below and illustrated in the accompanying drawings.

The assembly and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes an adjustable mount configured to releasably communicate with the vehicle. The mount is configured to operate between an extended position and a retracted position. A modular frame assembly is configured to translate along the adjustable mount and to selectively couple to one of a number of selectable locations along the mount. The modular frame is configured to hold the door of the vehicle and includes a frame having a first arm and a second arm as well as a hinge mount in communication with the first arm. A latch bar is also included and communicates with the second arm for engagement with the door latch mechanism of the door. The distance between the frame assembly and the vehicle is configured to change when the mount is adjusted between the extended position and the retracted position. Additional features and functions of the device are illustrated and discussed below.

Referring now to the drawings wherein like reference characters identify corresponding or similar elements in form and function throughout the several views. FIG. 1 in the drawings illustrates a rear view of a vehicle 99 with an adjustable hitch mounted door carrying assembly 101 mounted to a hitch 95 of vehicle 99. Assembly 101 is carrying at least one door 97 of the vehicle in an upright manner such that the door is hingedly coupled to a frame 103*a* of assembly 101. Door 97 may be transported with the vehicle 99. Assembly 101 may be removed and modified while door 97 is within frame to permit detachment from vehicle 99 and access to the rear storage area of vehicle 99.

Referring now also to FIGS. 2-5 in the drawings, assorted views of assembly 101 are illustrated. In particular with FIGS. 2-3, opposing side views of assembly 101 are illustrated. As seen, assembly 101 includes an adjustable mount 105, a first frame 103*a* and a second frame 103*b*. The frames 103*a/b* are in communication with mount 105. Mount 105 is adapted at end 107 for engagement with hitch 95 of vehicle 99. A pin hole and associated pin are used to secure end 107 within hitch 95.

Mount 105 includes an inner member 109 and an outer member 111. Outer member 111 is configured to translate or slide relative to inner member 109 while inner member 109 is secured to hitch 95. This translation allows the overall length of mount 105 to increase and decrease. Each includes a series of aligned apertures, namely apertures 113 are in member 109 (see FIG. 9) and apertures 115 are in member 111. Apertures 113/115 pass through members 109/111 to permit a securing device 117 there through. An example of a securing device is a pin. Apertures 113/115 are located along the same lateral/horizontal line within mount 105 such that apertures 113 and apertures 115 align at various locations depending upon the relative extension/retraction of members 109/111 to each other, so as to accept a single securing device 117. Passing device 117 through both sets of apertures 113/115 at a single location acts to lock members 109 and 111 relative to one another so as to restrict movement. It is understood that one or more devices 117 may be used along the length of mount 105.

Frames 103*a/b* are similar in form and function to one another. The features and characteristics of one will apply equally to the other. For purposes herein, description of frame 103*a* will be set forth in greater detail, knowing that such features are equally applicable to that of frame 103*b*. Like reference characters identify corresponding or similar elements in form and function throughout the several views between frame 103*a* and frame 103*b*.

Frames 103*a* and 103*b* each include an attachment member 118*a* and 118*b* respectively. Member 118*a*/118*b* is configured to rest along a lower portion of frames 103*a/b* and have a similar shape to that of mount 105. Members 118*a/b* are sized appropriately so as to translate around and along either inner member 109 or outer member 111. Members 118*a/b* also include a similar set of apertures 116*a/b* there through corresponding to apertures 113/115 in mount 105. By locating frames 103a/b concentrically with a selected set of apertures 113 and/or apertures 115, a single device 117 may be passed through all three. It is understood that device 117 may be used to only locate frames 103a/b to member 111 such that a second device 117 is used to separately locate member 111 to that of member 109. Such an embodiment would permit frames 103a/b to stay secured to member 111 while the length of mount 105 is adjusted between the extended and retracted positions.

It is understood from the drawings that members 118a/b are slightly offset relative to its respective frame. Frame 103a includes an offset wherein a larger portion of member 118a extends behind frame 103a. Aperture 116a is located in the forward portion of member 118a towards the distal end of member 111 and forward of frame 103a. Likewise, frame 103b includes an offset wherein a larger portion of member 118b extends in front of frame 103b. Aperture 116b is located in a rear portion of member 118b which is rearward of frame 103b. A securing device similar to that of device 117 is used to pass through apertures 116a/b and selected portions of member 109 and/or member 111. Ideally members 118a/b contact each other or are adjacent one another when secured with a securing device.

Figure 4:
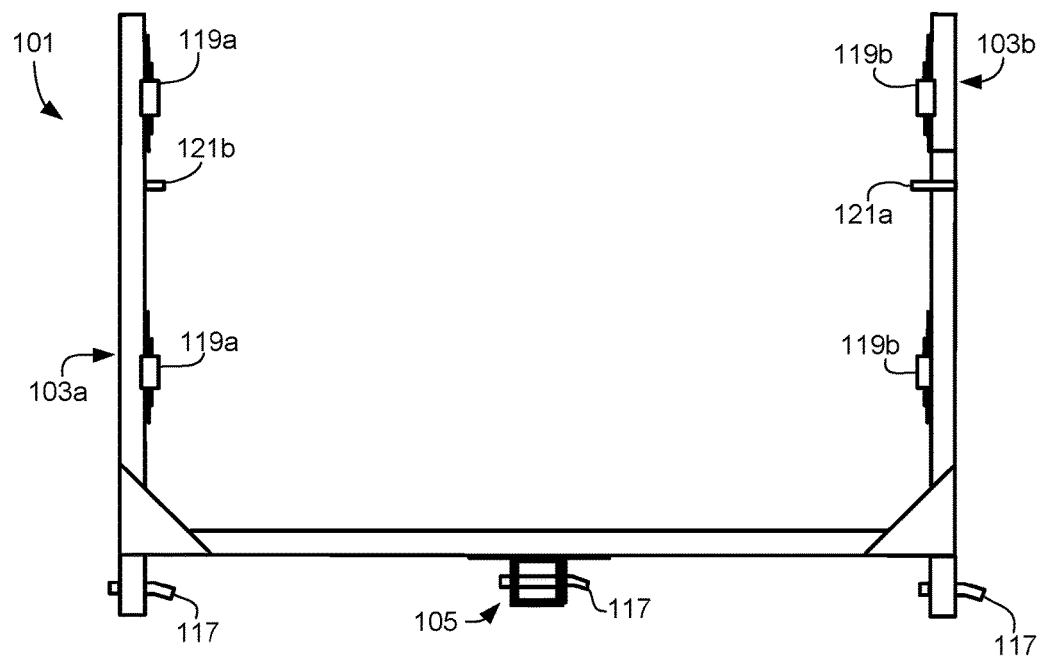
FIG. 4 is an enlarged front view of the adjustable hitch mounted door carrying assembly of FIG. 1.
Figure 5:
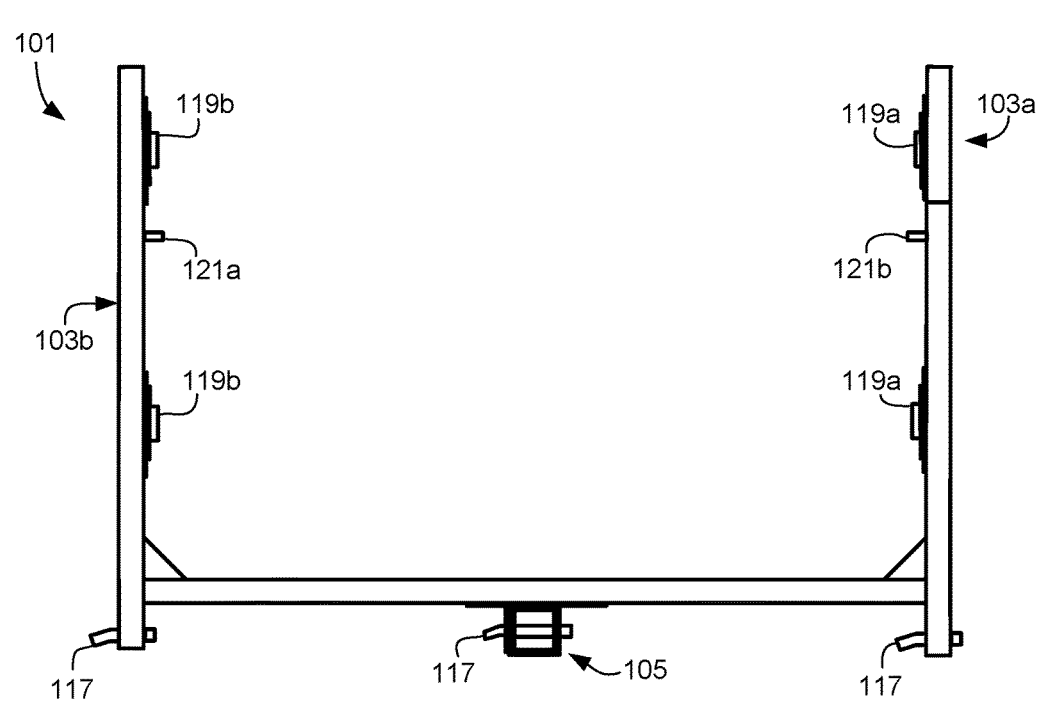
FIG. 5 is a rear view of the adjustable hitch mounted door carrying assembly of FIG. 4.

FIGS. 4 and 5 of the drawings illustrate a front and rear view of assembly 101. These, combined with FIGS. 2 and 3 serve to give a full picture of each frame 103a/b in assembly 101.

Figure 6:
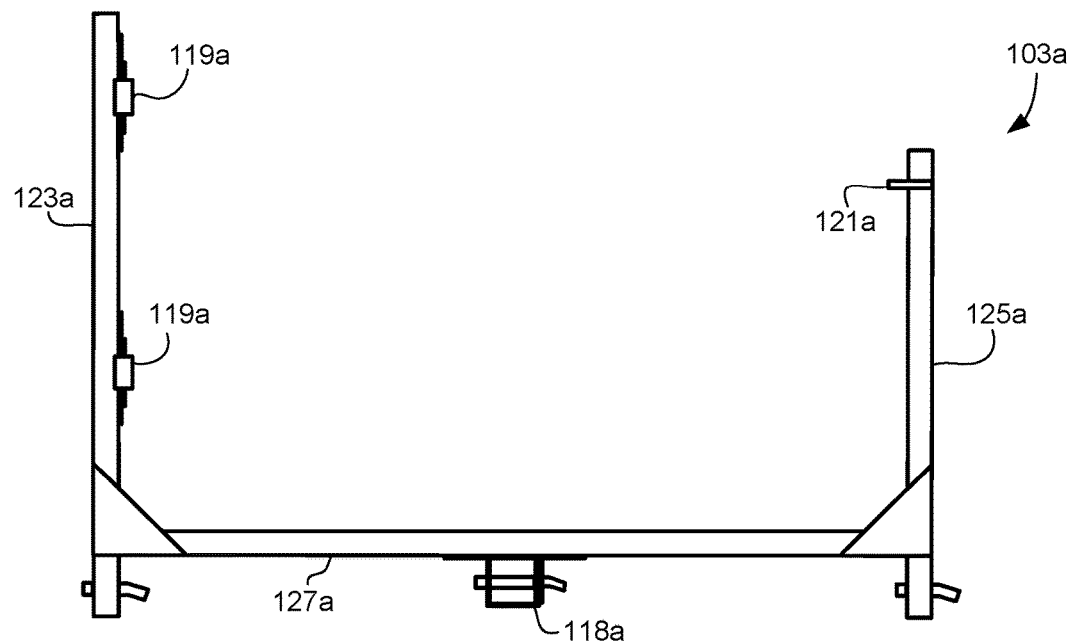
FIG. 6 is a front view of a first frame in the adjustable hitch mounted door carrying assembly of FIG. 4.
Figure 7:
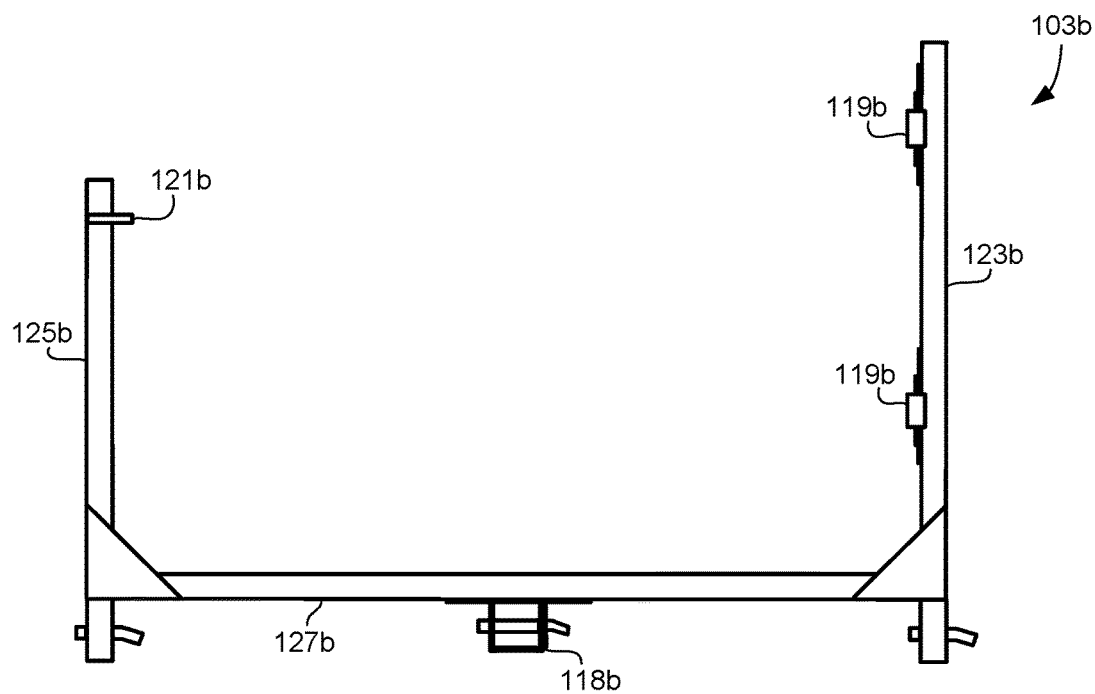
FIG. 7 is a front view of a second frame in the adjustable hitch mounted door carrying assembly of FIG. 4.

Referring now also to FIGS. 6 and 7 in the drawings, front views of frame 103a and frame 103b are illustrated. Frame 103a includes a set of arms, a hinge mount 119a, and a latch bar 121a. There exists a first arm 123a and a second arm 125a that are vertically aligned relative to a horizontal arm 127a. These arms are coupled together and supported by one or more braces to maintain their selective orientation. Attachment member 118a is coupled to a lower portion of horizontal arm 127a.

Hinge mounts 119a are coupled to first arm 123a and are configured to mimic similar hinge mounts of vehicle 99, such that door 97 may engage therein and pivot as would be done on vehicle 99. A latch bar 121a is also included and communicates with the second arm for engagement with the door latch mechanism 93 of the door 97. Latch bar 121a is configured to simulate the latch bar on vehicle 99 and is not restricted to the precise design depicted in the drawings. Using latch bar 121a allows for door 97 to lock in a secured position to frame 103a with mechanism 93. This helps to prevent door 97 from dislodging accidentally and to prevent theft.

As noted previously, frame 103b includes the same features and components as that of frame 103a described above. The same numbering of elements apply except wherein frame 103b uses a "b" identifier as opposed to the "a" identifier used with frame 103a. Of note is that frame 103b is somewhat a mirrored image of that of frame 103a. As seen in FIG. 7, first arm 123b and second arm 125b are swapped on opposing ends of horizontal arm 127b compared to that of frame 103a. This allows doors 97 to maintain an equalized weight balance around mount 105 and also helps to keep doors 97 facing the same direction.

Figure 8:
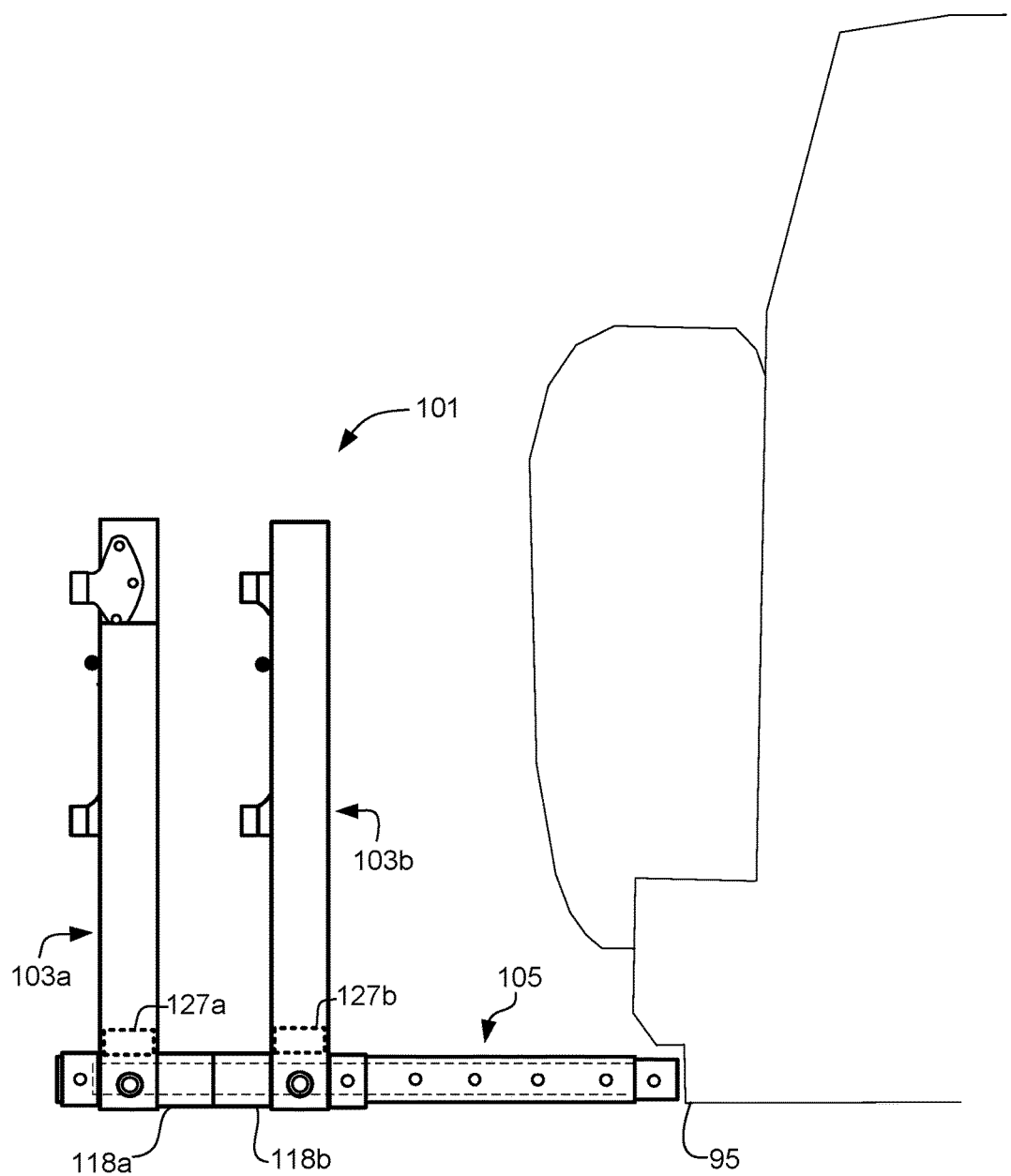
FIG. 8 is an enlarged side view of the adjustable hitch mounted door carrying assembly of FIG. 1 in a retracted position.
Figure 9:
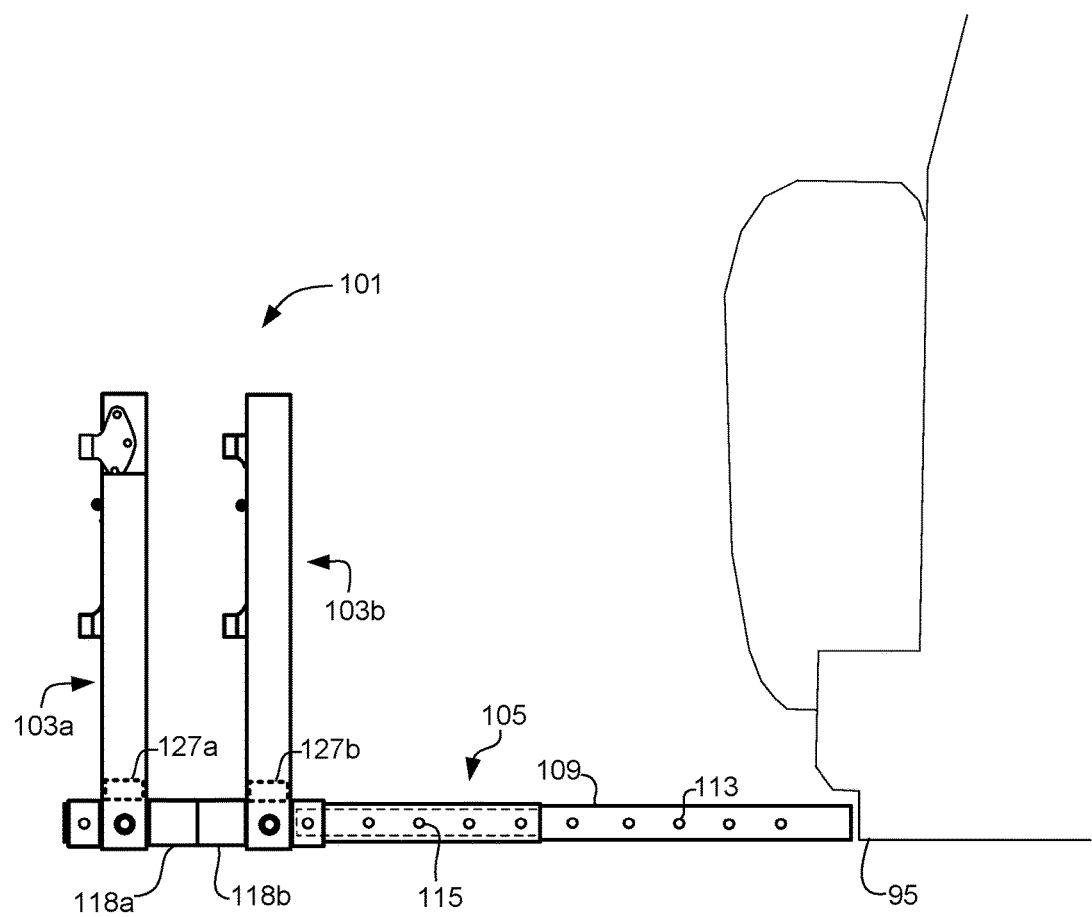
FIG. 9 is an enlarged side view of the adjustable hitch mounted door carrying assembly of FIG. 1 in an extended position.

Referring now also to FIGS. 8 and 9 in the drawings, assembly 101 is illustrated in both an extended position and a retracted position. In FIG. 8, assembly 101 is illustrated in a retracted position (doors not shown). The retracted and extended positions are defined by the amount of overlap there is between inner member 109 and outer member 111 of mount 105. When outer member 111 is fully translated over inner member 109 as seen in FIG. 8, assembly 101 is fully retracted. Even when fully retracted, the location of frames 103a/b are yet still adjustable by their ability to translate along outer member 111. Therefore, although frames 103a/b are still coupled to a furthermost portion of mount 105, it is understood that frames 103a/b are adjustable still, such that they may be located closer to vehicle 97. The ability to modify location is useful as clearance between frames 103a/b and vehicle 97 may be affected by tire size, vehicle modifications, and accessories located at the rear of the vehicle. Users are able to select the best location for each frame. As seen in FIG. 9, frames 103a/b are shown in an extended position. An extended position is any position of mount 105 wherein outer member 111 is not fully retracted. The degree to which outer member 111 may extend past the end of member 109 is dependent upon strength characteristics of mount 105. Exemplary materials for mount 105 may be that of steel, aluminum, or composites.

Figure 10:
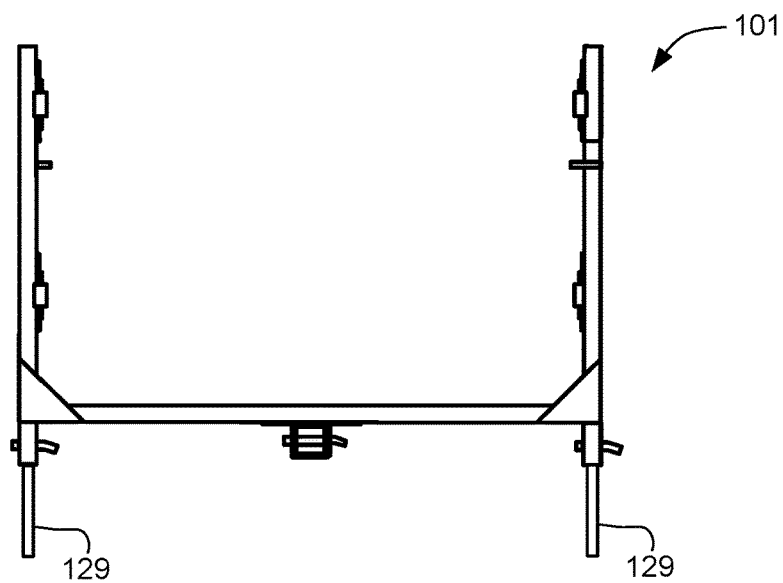
FIG. 10 is a front view of the adjustable hitch mounted door carrying assembly of FIG. 4 with telescoping legs.
Figure 11:
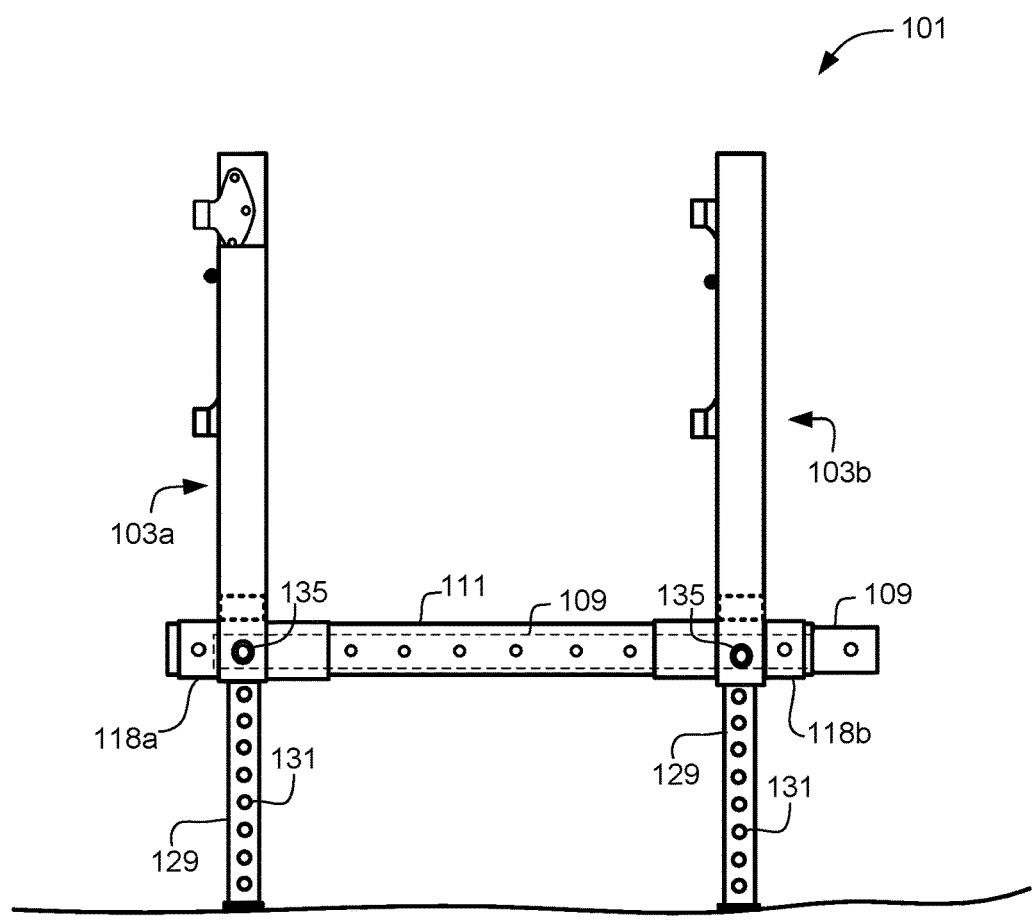
FIG. 11 is a side view of the adjustable hitch mounted door carrying assembly of FIG. 10.

Referring now also to FIGS. 10 and 11 in the drawings, a front view and a side view of assembly 101 is illustrated wherein a pair of leg stands 129 and 131 are used to elevate frames 103a/b above the ground. Assembly 101 is configured to provide a method and function of securely holding doors 97 in an elevated position off the ground when not used in vehicle 99. Assembly 101 further includes optional leg stands that are located in the first arm 123a/b and second arm 125a/b of frames 103a/b. The leg stands are shaped in a similar form as that of arms 123a/b and 125a/b. The leg stands translate into the arms and are configured to include a plurality of apertures 131. Apertures 131 are configured to align with corresponding apertures 135 in arms 123a/b and 125a/b. A securing device such as device 117 is used to set the particular length of each leg stand. The leg stands are independently adjustable. The leg stands may also include pads at the lower surface of each wherein the stands communicate with the ground.

Figure 12:
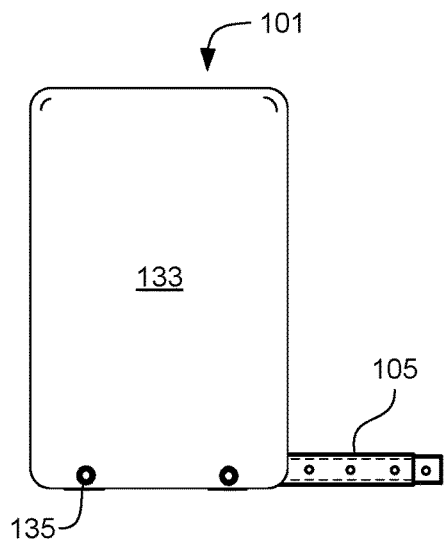
FIG. 12 is a side view of a cover used on the adjustable hitch mounted door carrying assembly of FIG. 4.
Figure 13:
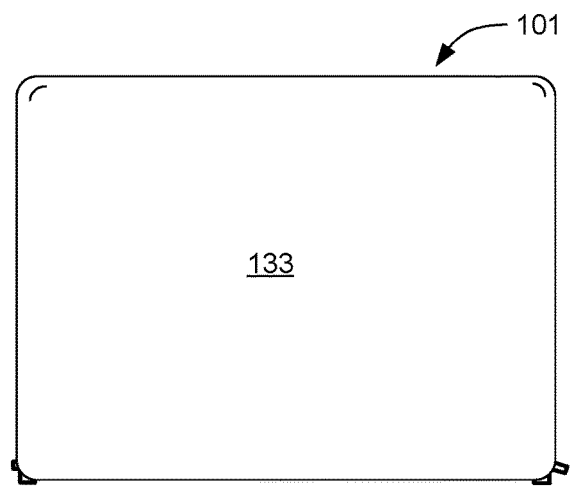
FIG. 13 is a front view of the cover on the adjustable hitch mounted door carrying assembly of FIG. 12.

Referring now also to FIGS. 12 and 13 in the drawings, an optional cover used in assembly 101 is illustrated. Cover 133 is configured to surround a portion of assembly 101 so as to provide protection to doors 97. This is useful where vehicle 99 is susceptible to kicking up debris which can scratch or harm the doors. Cover 133 can be made from either a hardened material designed to retain a set shape or from a flexible material that lies across doors 97 and/or frames 103a/b to some degree. A hardened cover allows for no contact with doors when used. Cover 133 is configured to couple to any of the apertures described above with a securing device similar to that of device 117. As seen in the figures, cover 133 is secured to apertures 135 located in each arm and below that of the horizontal arms.

Figure 14:
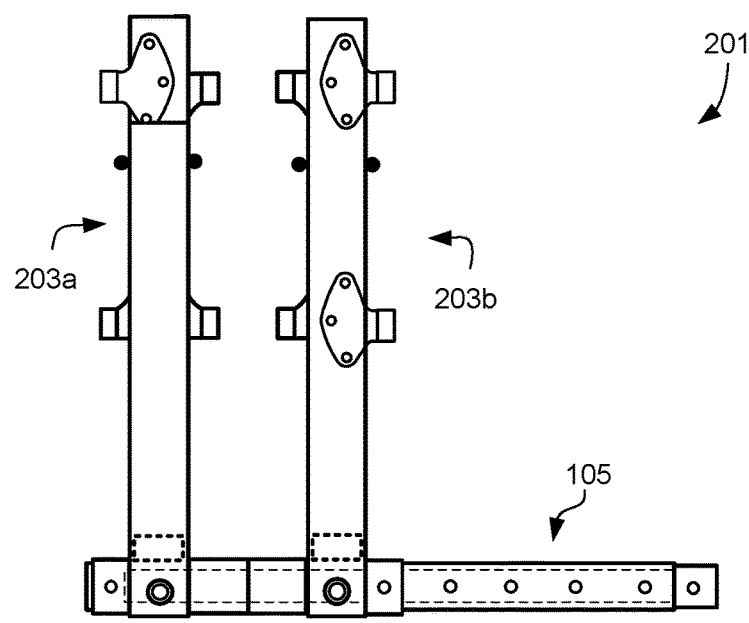
FIG. 14 is a side view of an alternative embodiment of the adjustable hitch mounted door carrying assembly of FIG. 4.

Referring now also to FIG. 14 in the drawings, an alternative embodiment of assembly 101 is illustrated. Assembly 201 is similar in form and function to that of assembly 101 except as herein noted. Assembly 201 differs in that the frames 203a/b are configured to support two doors each. In other words, two sets of hinges 119 and latch bars 121 are used. One set on the front side and one set on the rear side of each frame 203a/b. This allows a payload capacity of 4 doors to be carried by merely changing out frames 103a/b with frames 203a/b. The distance between frames 203a and 203b may be adjusted by merely using different apertures such that the attachment members are separated accordingly.

In use, the adjustable mount is lifted and set within the hitch of the vehicle. The inner member of the mount is secured and the outer member of the mount is located at a selected position. The outer member may be pinned or secured at this time while the frames are located around the outer member. Each frame is located individually along the length of the outer member. The doors of the vehicle are detached and located such that the hinges of the doors engage the hinges on the frames of the assembly of the present application. The doors are rotated about the hinges and secured to the latch bar with the door locking mechanism. The door may be locked in the closed position to prevent removal. At any time, each frame may be individually positioned on the adjustable mount. A securing device is used to pass through a series of apertures between the frames and the mount. Access to the rear cargo area of the vehicle is granted by unsecuring the members of the mount and sliding the outer member away from the vehicle. The space granted is sufficient to open the back hatch, move the tire, and open the back door. All this is done while the doors remain secured in the frames.

Another function and feature of the assembly of the present application is that assembly 101 permits for storage at remote locations. When removing assembly 101 from the vehicle, the doors may either remain secured to the frames or be removed. A user separates the frames from one another along the mount. The leg stands are adjusted to a desired length and the mount is detached from the vehicle. Each leg stand may be further adjusted in length depending on ground contour. The mount extends between the frames.

Although the frames used in assembly 101 are shown in use with the doors of the vehicle, it is understood that they may be modified to also work with bikes and other outdoor equipment to assist in each of transportation. A further feature is that assembly 101 is configured to collapse for ease of transportation such that the entire assembly can fit into the rear of the vehicle when not used.

The current application has many advantages over the prior art including at least the following: (1) a hitch mounted carrying assembly for the doors of a vehicle; (2) ability to adjust the relative location of the doors relative to the vehicle to permit rear access to the vehicle interior; and (3) storage of the doors in the assembly at remote locations where the doors are elevated off the ground.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A hitch mounted carrying assembly for transporting a door of a vehicle, comprising:
    an adjustable mount configured to releasably communicate with the vehicle, the mount configured to operate between an extended position and a retracted position; and
    a modular frame assembly configured to translate along the adjustable mount and to selectively couple to a first location along the mount, the modular frame configured to hold the door of the vehicle, the modular frame including:
        a frame having a first arm and a second arm, each of the first and second arm being a hollow tubular structure;
        a hinge mount in communication with the first arm and configured to support the door of the vehicle; and
        a latch bar in communication with the second arm for engagement with the door of the vehicle; and
        a pair of leg stands in communication with the frame assembly for selectively elevating the mount off the ground, the pair of leg stands configured to translate along with the modular frame assembly along the adjustable mount each of the leg stands being configured to translate within a respective one of the first and second arms of the frames assembly;
    wherein the distance between the frame assembly and the vehicle is configured to change when the mount is adjusted between the extended position and the retracted position.

2. The assembly of claim 1, wherein the frame assembly and the mount are configured to collapse for ease of transportation within the vehicle.

3. The assembly of claim 1, wherein the frame assembly is removable from the adjustable mount.

4. The assembly of claim 1, wherein the hinge mount is configured to allow the door to pivot about the frame.

5. The assembly of claim 1, wherein the latch bar is configured to engage a locking mechanism on the door.

6. The assembly of claim 1, wherein the mount is adjustable between positions without decoupling the frame assembly from the mount.

7. The assembly of claim 1, wherein the pair of leg stands are independently adjustable.

8. The assembly of claim 1, further comprising:
    a cover configured to surround the frame assembly and a portion of the mount.

9. The assembly of claim 8, wherein the cover is configured to releasably couple to at least one of the first arm and the second arm.

10. The assembly of claim 1, wherein the frame assembly includes a second hinge mount and a second latch bar facing opposite the hinge mount and the latch bar.

11. A method of transporting a door of a vehicle, comprising:
    locating a mount within a hitch of the vehicle, the mount including an outer member and an inner member, the outer member configured to translate along the outer surface of the inner member, the mount including a series of apertures between each member so as to align at selected positions of the outer and inner member;
    positioning a frame assembly on the mount, the frame assembly including a first arm and a second arm, each of the first and second arm being a hollow tubular structure, a hinge mount in communication with the first arm and a latch bar in communication with the second arm;
    resting a door of the vehicle on the hinge of the frame assembly such that each of the leg stands translates within a respective one of the first and second arms of the frame assembly;
    closing the door on the latch bar;
    engaging a pair of leg stands in communication with the frame assembly for selectively elevating the mount off the ground; and
    adjusting the position of the frame assembly and pair of leg stands relative to the vehicle between an extended position and a retracted position.

12. The method of claim 11, further comprising:
    placing a cover over a portion of the frame assembly.

13. The method of claim 11, further comprising:
  locking the door to the frame assembly to the latch bar using the locking mechanism of the door assembly.

14. The method of claim 11, further comprising:
  detaching the mount from the hitch of the vehicle.

15. The method of claim 11, further comprising:
  adjusting the length of the leg stands in communication with the frame assembly to extend below the frame assembly.

16. The method of claim 11, further comprising:
  resting the frame assembly on a surface while being supported in an elevated position by the leg stands.

17. The method of claim 11, wherein access to an interior of the vehicle is permitted in the extended position.

\* \* \* \* \*